Patented July 5, 1949

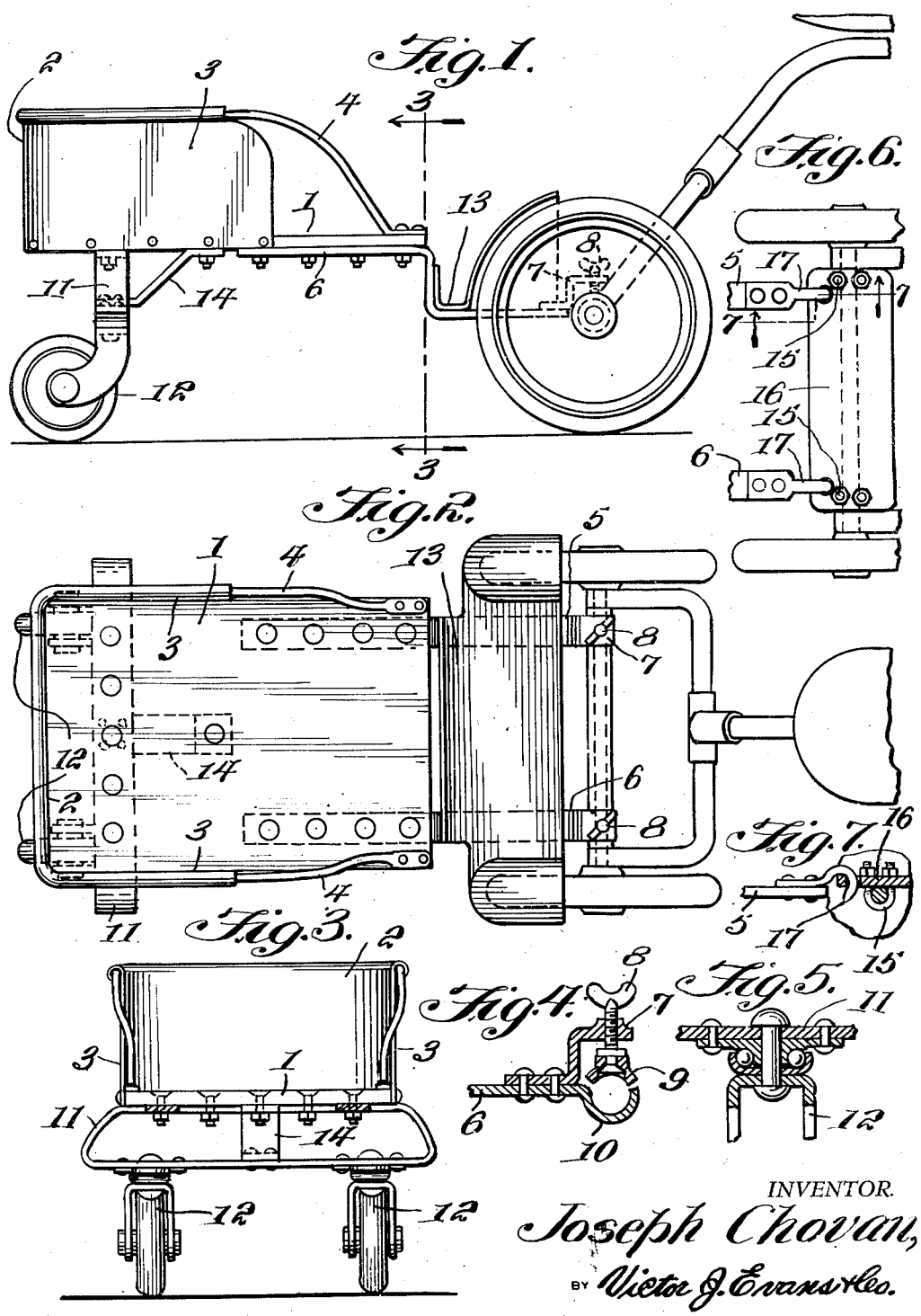

2,475,177

UNITED STATES PATENT OFFICE 2,475,177

ATTACHABLE CART FOR TRICYCLES

Joseph Chovan, Kenosha, Wis.

Application December 27, 1946, Serial No. 718,748

2 Claims. (Cl. 280—204)

This invention pertains to a cart adapted to be detachably connected to a tricycle to accommodate a small child.

It is an object of the invention to provide a detachable cart for a tricycle which will safely hold a small child, and at the same time not interfere with the manipulation of the tricycle.

A further object is to provide a cart which can be quickly and conveniently attached to a tricycle with very little effort, thus making it usable by children safely.

These and other objects are attained by the novel construction and arrangement of parts hereinafter described and illustrated by the accompanying drawings, forming a part hereof, and in which:

Fig. 1 is an elevational view of a device embodying the invention.

Fig. 2 is a plan view of the device shown in Fig. 1.

Fig. 3 is a view taken on the line 3—3 of Fig. 1.

Fig. 4 is a sectional view of a clamp used in the device.

Fig. 5 is a sectional view of a caster used for the wheels of the cart.

Fig. 6 is a plan view of a modified form of device for connecting a cart to a tricycle.

Fig. 7 is a sectional view taken on the line 7—7 of Fig. 6.

Referring to the drawings, there is shown a cart having a wooden seat 1 having a sheet metal back 2 and sides 3 attached thereto by means of screws. A heavy wire or rod 4 is screwed to the seat 1 and the sides and back are crimped over the rod.

Two braces 5 and 6 are bolted to the bottom of the seat, the braces extending downwardly and then horizontally to the axle of a tricycle. At the ends of the braces are clamp hitches, each including a bracket 7 threadedly receiving a bolt 8 with a wing to facilitate turning thereof. Attached to the bolt 8 is a collar 9 which is arranged to clamp an axle of a tricycle to a tubular member 10.

A metal frame 11 is bolted to the bottom of the rear of the seat, and two caster wheels 12 are mounted on the frame 11. A metal platform 13 is provided to protect a child's feet, the platform being bolted to the braces 5 and 6; and a brace 14 is secured to the bottom of frame 11 and to the bottom of seat 1.

In the modified form shown in Figs. 6 and 7, U-bolts 15 hold a plate 16 on the axle of a tricycle, the plate 16 having a pair of apertures to receive hooks 17 on braces 5 and 6.

It will be seen that the cart can be quickly and easily attached and detached from the axle of a tricycle with very little effort, thus enabling it to be manipulated by children. The device is sturdy and has few parts to get out of order, making it especially adapted for use by children who naturally handle tricycles and similar toys roughly.

The above description is to be considered as illustrative and not limitative of the invention of which modifications can be made without departing from the spirit and scope of the invention as denoted by the appended claims.

The invention having been described, what is claimed is:

1. In a cart adapted to be attached to the axle for the rear wheels of a tricycle, a seat, a frame attached to the seat, a pair of caster wheels mounted on the frame, a rod attached to the seat, a back and sides crimped over the rod, a pair of braces attached to the seat, a platform attached to the braces, wheel guards formed on said platform and means on the braces to connect the cart to the axle of the tricycle.

2. In a cart adapted to be attached to the axle for the rear wheels of a tricycle, a seat, a frame attached to the seat, a pair of caster wheels connected to the frame, a brace connected to the frame and to the bottom of the seat, a rod mounted on the seat, a back and sides crimped over the rod, a pair of braces mounted on the seat, said braces extending down and then horizontally, a platform attached to the horizontal portion of the braces, wheel guards formed on said platform adapted to overlie said rear wheels and clamps at the ends of the braces for connecting the cart to the axle of the tricycle.

JOSEPH CHOVAN.

REFERENCES CITED

The following references are of record in the file of this patent:

UNITED STATES PATENTS

| Number | Name | Date |
|---|---|---|
| 2,158,780 | Vogt | May 16, 1939 |
| 2,334,387 | Curty | Nov. 16, 1943 |

FOREIGN PATENTS

| Number | Country | Date |
|---|---|---|
| 422,768 | Great Britain | Jan. 17, 1935 |